(No Model.) 2 Sheets—Sheet 2.
M. MAYER.
DYNAMO ELECTRIC MACHINE OR MOTOR.
No. 461,979. Patented Oct. 27, 1891.
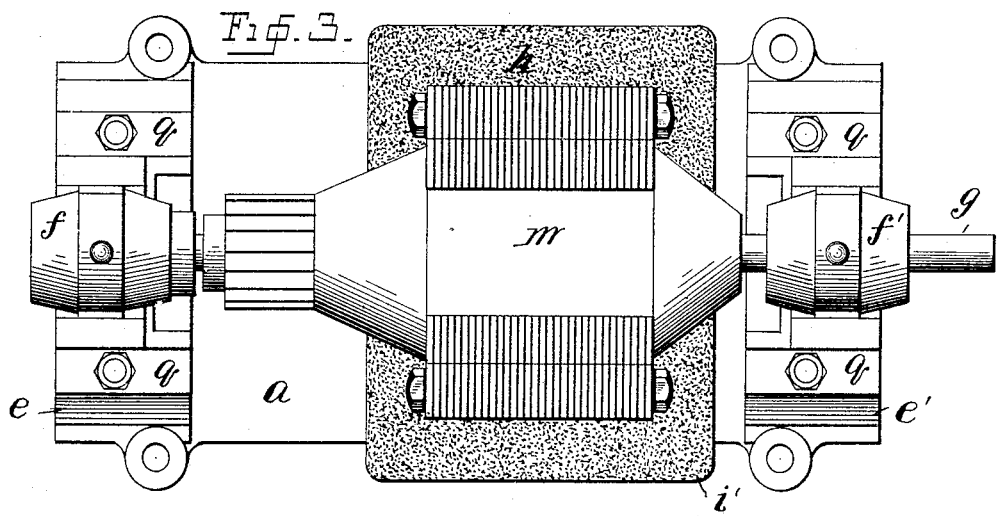
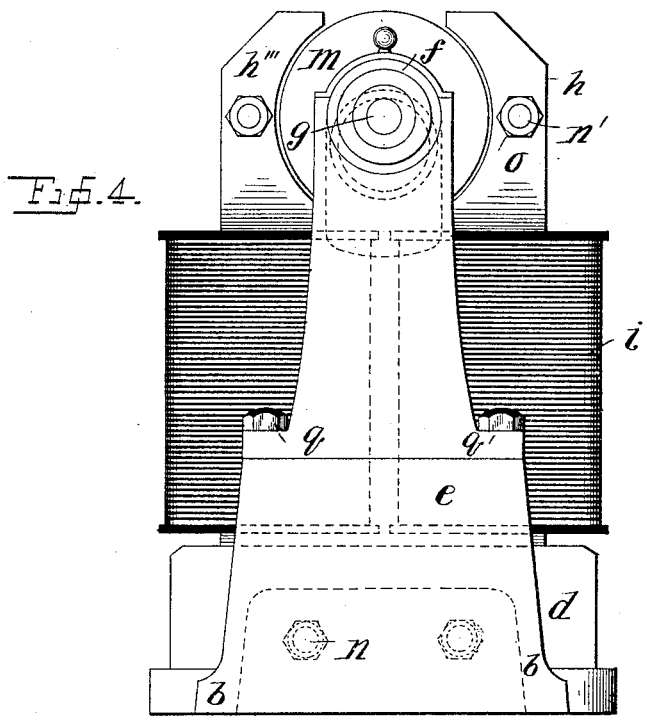
Witnesses
U. A. Courtland
Nellie L. Pope
Inventor
MAX MAYER
BY HIS ATTORNEY
Edward P. Thompson

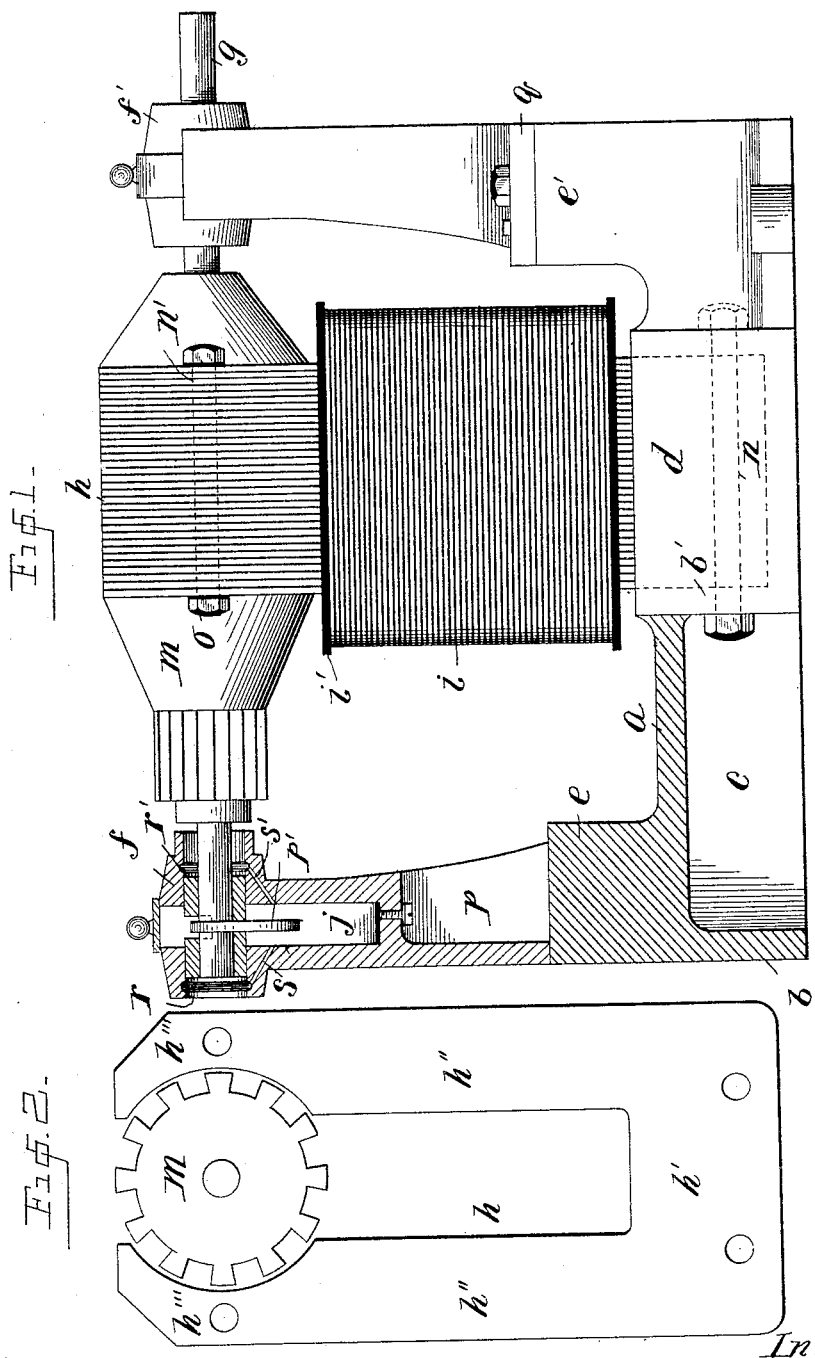

United States Patent Office.

MAX MAYER, OF NEW YORK, N. Y., ASSIGNOR TO THE ZUCKER & LEVETT CHEMICAL COMPANY, OF SAME PLACE.

DYNAMO-ELECTRIC MACHINE OR MOTOR.

SPECIFICATION forming part of Letters Patent No. 461,979, dated October 27, 1891.

Application filed May 5, 1891. Serial No. 391,635. (No model.)

*To all whom it may concern:*

Be it known that I, MAX MAYER, a citizen of the United States, and a resident of New York, county and State of New York, have invented certain new and useful Improvements in Electric Motors or Dynamos, of which the following is a specification.

My present invention relates to the construction of the field-magnet and frame of a dynamo or electric motor.

The object of the invention is to provide means whereby the manufacture of efficient electric machines for generation and power may be cheapened.

The invention in all its details is set forth in the accompanying drawings.

Figure 1 is a side elevation in which the left-hand portion is in vertical central section. Fig. 2 illustrates the armature and field-magnet laminæ by themselves in front elevation. Fig. 3 is a plan of the complete machine in so far as my invention is concerned. The collecting-brushes and other well-known and necessary adjuncts are omitted. Fig. 4 is a front elevation of the machine shown in Fig. 3. The dotted lines show certain interior constructions.

The base-plate of the machine consists of a casting having a horizontal plate $a$ and side rectangular frame $b$, inclosing the space $c$, which is separated from a box $d$, one of whose sides is formed by one side $b'$ of the frame $b$. A standard $e$ rises from the left hand of the plate $a$, and a standard $e'$ rises from the base-plate at the right of the box $d$. The tops of these standards $e$ and $e'$ are planed flat to support the castings which carry the bearings $f f'$ for the shaft $g$. The space or box $c$ has its opening at the bottom and the box $d$ has its opening at the top of the base-plate casting. The whole base-plate is in one casting. The interior length of the box $c$ should be equal to or preferably slightly greater than the exterior length of the box $d$.

The field-magnet core consists of laminated plates $h$, of the shape shown in full in Fig. 2. Each plate has a yoke $h'$, limbs $h''$, and pole-pieces $h'''$. The distance between the limbs $h''$ is slightly greater than double the thickness of the windings of either field-magnet coil $i$, and the pole-pieces $h'''$ of each lamina consist of extensions provided with arc-shaped recesses for portions of the armature $m$. The extensions or pole-pieces $h'''$ are no greater in width than the limbs, so that the coils $i$ may first be wound upon spools $i'$ and the latter placed upon or removed from the limbs, as occasion requires. Before the coils are thus applied bolts $n$ are put into the box $c$ and then passed through the box $d$ and through yokes $h'$, which fit snugly in the said box $d$. After the coils are slipped upon the limbs $h''$ the bolts $n'$ are put through the pole-pieces $h'''$ and fastened thereto by nuts $o$.

The upper castings for carrying the bearings $f f'$, and which are supported upon the lower casting or base-plate, consist of boxes $p$, cast with lower flanges $q$, which are bolted to the standards $e\ e'$. Above the boxes $p$ are oil-cups $j$, in which are suspended rings $p'$, supported loosely on the shaft $g$, for the purpose of feeding oil to the shaft, beyond each end of which is a groove $r$ in each bearing $f f'$, in which the oil slung out by centrifugal force is caught and conducted by hole $s$ back to the oil-cup. A groove $r'$ is in each bearing near the opposite end, which also collects the oil for its passage through the hole $s'$ into the oil-cup $j$.

Fig. 2 shows a lamina of the field-magnet and armature just as they are after stamping them simultaneously from a single sheet of wrought-iron.

I claim as my invention—

In a dynamo or electric motor, the combination of a base-plate provided with two cavities $c$ and $d$, the former opening downward and the latter upward, standards $e\ e'$ at opposite ends supporting castings which carry the shaft-bearings $f f'$, field-magnet laminated cores having limbs $h''$ of a given width and polar extensions $h'''$ thereto of the same width, yokes $h'$ for the field-magnet core, fitting in the cavity $d$ and fastened therein by bolts $n$, the cavity $c$ being greater than the length of the bolts $n$, field-magnet coils slipped upon said magnet-limbs, and bolts $n'$, passing through and bolted to the polar extensions.

In testimony that I claim the foregoing as my invention I have signed my name, in presence of two witnesses, this 27th day of April, 1891.

MAX MAYER.

Witnesses:
EDWARD P. THOMPSON,
GEORGE T. MIATT.